(12) United States Patent
Sheppard et al.

(10) Patent No.: US 12,206,942 B2
(45) Date of Patent: *Jan. 21, 2025

(54) METHODS AND APPARATUS TO ESTIMATE POPULATION REACH FROM DIFFERENT MARGINAL RATING UNIONS

(71) Applicant: The Nielsen Company (US), LLC, New York, NY (US)

(72) Inventors: Michael Sheppard, Holland, MI (US); Jonathan Sullivan, Hurricane, UT (US); Edward Murphy, North Stonington, CT (US); Michael Morgan, Bartlett, IL (US); Ludo Daemen, Duffel (BE)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 18/320,958

(22) Filed: May 19, 2023

(65) Prior Publication Data
US 2024/0031648 A1     Jan. 25, 2024

Related U.S. Application Data

(63) Continuation of application No. 17/734,792, filed on May 2, 2022, now Pat. No. 11,689,767, which is a
(Continued)

(51) Int. Cl.
*H04H 60/32*     (2008.01)
*G06Q 30/0201*     (2023.01)
(Continued)

(52) U.S. Cl.
CPC ... *H04N 21/44224* (2020.08); *G06Q 30/0201* (2013.01); *H04N 21/44222* (2013.01);
(Continued)

(58) Field of Classification Search
CPC ....... H04N 21/44224; H04N 21/44222; H04N 21/252; H04N 21/25883; H04N 21/4665; G06Q 30/0201
(Continued)

(56) References Cited

U.S. PATENT DOCUMENTS 8,214,518 B1    7/2012  Bertz
8,327,396 B2 *  12/2012 Ramaswamy ..... H04N 21/4432
                                                    725/19

(Continued)

FOREIGN PATENT DOCUMENTS

WO      2020190650 A1    9/2020

OTHER PUBLICATIONS

Araujo et al. Characterizing videos, audience and advertising in Youtube channels for kids, arXiv:1707.00971v1 [cs.CY], Jul. 4, 2017, 11 pages.
(Continued)

*Primary Examiner* — Jefferey F Harold
*Assistant Examiner* — Sahar Aqil Riaz (57) ABSTRACT

Example methods, apparatus, systems, and articles of manufacture are disclosed to estimate population reach for different unions based on marginal ratings. An example apparatus includes memory and processor circuitry to determine a population reach estimate of a union of time intervals for which media ratings data is available, the population reach estimate based on a pseudo universe estimate of a population audience corresponding to the union of the time intervals; determine a pseudo universe estimate of a recorded audience corresponding to the union of the time intervals; determine the pseudo universe estimate of the population audience based on the pseudo universe estimate of the recorded audience; and in response to a decision to update the pseudo universe estimate of the population audience to reduce an
(Continued)

error of the population reach estimate output the population reach estimate of the union when the error of the population reach estimate satisfies a threshold.

20 Claims, 6 Drawing Sheets

Related U.S. Application Data continuation of application No. 16/893,129, filed on Jun. 4, 2020, now Pat. No. 11,323,772, which is a continuation of application No. 15/445,530, filed on Feb. 28, 2017, now Pat. No. 10,681,414.

(51) Int. Cl.
| | | |
|---|---|---|
| *H04N 21/442* | (2011.01) | |
| *H04N 21/25* | (2011.01) | |
| *H04N 21/258* | (2011.01) | |
| *H04N 21/466* | (2011.01) | |

(52) U.S. Cl.
CPC ..... *H04N 21/252* (2013.01); *H04N 21/25883* (2013.01); *H04N 21/4665* (2013.01)

(58) Field of Classification Search
USPC .......................................................... 725/14
See application file for complete search history.

(56) References Cited

U.S. PATENT DOCUMENTS

| | | | |
|---|---|---|---|
| 8,370,489 B2* | 2/2013 | Mazumdar | G06Q 30/0201 709/224 |
| 10,045,082 B2 | 8/2018 | Nagaraja Rao et al. | |
| 10,380,633 B2 | 8/2019 | Morovati et al. | |
| 10,382,818 B2 | 8/2019 | Sheppard et al. | |
| 10,958,956 B2 | 3/2021 | Ricci | |
| 11,012,746 B2* | 5/2021 | Nagaraja Rao | G06F 16/215 |
| 11,039,190 B1 | 6/2021 | Dailey et al. | |
| 11,481,802 B2 | 10/2022 | Sheppard et al. | |
| 2011/0015992 A1 | 1/2011 | Liffiton et al. | |
| 2012/0254922 A1 | 10/2012 | Rangarajan et al. | |
| 2016/0027037 A1* | 1/2016 | Cai | G06Q 30/0246 705/14.42 |
| 2016/0232538 A1 | 8/2016 | Papakostas et al. | |
| 2017/0034593 A1* | 2/2017 | Ray | H04N 21/812 |
| 2017/0053306 A1 | 2/2017 | Sissenich et al. | |
| 2018/0315060 A1 | 11/2018 | Sheppard et al. | |
| 2020/0145720 A1 | 5/2020 | Krauss et al. | |
| 2021/0084370 A1 | 3/2021 | Doe | |
| 2021/0248629 A1 | 8/2021 | Sullivan et al. | |
| 2021/0303552 A1 | 9/2021 | Pandey et al. | |
| 2022/0036390 A1 | 2/2022 | Sheppard et al. | |
| 2022/0264179 A1 | 8/2022 | Sheppard et al. | |
| 2023/0042879 A1 | 2/2023 | Sheppard et al. | |
| 2023/0070980 A1 | 3/2023 | Sullivan et al. | |
| 2023/0111617 A1 | 4/2023 | Sheppard et al. | |

OTHER PUBLICATIONS

Buzzard, The Definition of the Audience in the History of Television Audience Research, University Microfilms International, 1985, 483 pages.

Esch et al., Appendix 8 Numerical Methods for Solving Nonlinear Equations, Asset and Risk Management: Risk Oriented Finance, published 2005 by John Wiley & Sons Ltd., 7 pages.

International Searching Authority, International Search Report & Written issued Opinion, in connection with application No. PCT/US2021/026010, on Jul. 26, 2021, 8 pages.

United States Patent and Trademark Office, "Non-Final Office Action," issued in connection with U.S. Appl. No. 17/892,659, on Oct. 18, 2023, 26 pages.

United States Patent and Trademark Office, "Non-Final Office Action," issued Oct. 8, 2021 in connection with U.S. Appl. No. 17/008,263, 19 pages.

United States Patent and Trademark Office, "Restriction Requirement," issued in connection with U.S. Appl. No. 17/892,659, on Mar. 22, 2024, 6 pages.

United States Patent and Trademark Office, Advisory Action, issued in connection with U.S. Appl. No. 17/408,208, on Mar. 3, 2023, 2 pages.

United States Patent and Trademark Office, Final Office Action, issued in connection with U.S. Appl. No. 17/408,208, on Apr. 20, 2022, 26 pages.

United States Patent and Trademark Office, Final Office Action, issued in connection with U.S. Appl. No. 17/408,164, dated Dec. 8, 2023, 17 pages.

United States Patent and Trademark Office, Final Office Action, issued in connection with U.S. Appl. No. 16/843,650, mailed on Apr. 10, 2023, 40 pages.

United States Patent and Trademark Office, Non-Final Office Action, issued in connection with U.S. Appl. No. 16/676,158, on Mar. 18, 2022, 29 pages.

United States Patent and Trademark Office, Non-Final Office Action, issued in connection with U.S. Appl. No. 17/099,510, on Mar. 29, 2022, 6 pages.

United States Patent and Trademark Office, Non-Final Office Action, issued in connection with U.S. Appl. No. 17/408,208, dated May 10, 2023, 9 Pages.

United States Patent and Trademark Office, Non-Final Office Action, issued in connection with U.S. Appl. No. 17/408,164, dated Mar. 29, 2023, 14 pages.

* cited by examiner

METHODS AND APPARATUS TO ESTIMATE POPULATION REACH FROM DIFFERENT MARGINAL RATING UNIONS

CROSS-REFERENCE TO RELATED APPLICATIONS

This patent arises from a continuation of U.S. patent application Ser. No. 17/734,792 (now U.S. Pat. No. 11,689,767), which was filed on May 2, 2022, which is a continuation of U.S. patent application Ser. No. 16/893,129 (now U.S. Pat. No. 11,323,772), which was filed on Jun. 4, 2020, which is a continuation of U.S. patent application Ser. No. 15/445,530 (now U.S. Pat. No. 10,681,414), which was filed on Feb. 28, 2017. U.S. patent application Ser. No. 17/734,792, U.S. patent application Ser. No. 16/893,129, and U.S. patent application Ser. No. 15/445,530 are hereby incorporated herein by reference in their entireties. Priority to U.S. patent application Ser. No. 17/734,792, U.S. patent application Ser. No. 16/893,129, and U.S. patent application Ser. No. 15/445,530 is hereby claimed.

FIELD OF THE DISCLOSURE

This disclosure relates generally to media audience measurement, and, more particularly, to methods and apparatus to estimate population reach from different marginal rating unions.

BACKGROUND

Determining a size and demographics of an audience of a media presentation helps media providers and distributors schedule programming and determine a price for advertising presented during the programming. In addition, accurate estimates of audience demographics enable advertisers to target advertisements to certain types and sizes of audiences. To collect these demographics, an audience measurement entity enlists a group of media consumers (often called panelists) to cooperate in an audience measurement study (often called a panel) for a predefined length of time. In some examples, the audience measurement entity obtains (e.g., directly, or indirectly from a media service provider) return path data from media presentation devices (e.g., set-top boxes) that identifies tuning data from the media presentation device. In such examples, because the return path data may not be associated with a known panelist, the audience measurement entity models and/or assigns viewers to represent the return path data. Additionally, the media consumption habits and demographic data associated with the enlisted media consumers are collected and used to statistically determine the size and demographics of the entire audience of the media presentation. In some examples, this collected data (e.g., data collected via measurement devices) may be supplemented with survey information, for example, recorded manually by the presentation audience members.

DETAILED DESCRIPTION

Audience measurement entities seek to understand the composition and size of audiences of media, such as television programming. Such information allows audience measurement entity researchers to, for example, report advertising delivery and/or targeting statistics to advertisers that target their media (e.g., advertisements) to particular audiences. Additionally, such information helps to establish advertising prices commensurate with audience exposure and demographic makeup (referred to herein collectively as "audience configuration"). One way to gather media presentation information is to gather the media presentation information from media output devices (e.g., gathering television presentation data from a set-top box (STB) connected to a television). As used herein, media presentation includes media output by a media device regardless of whether or not an audience member is present (e.g., media output by a media output device at which no audience is present, media exposure to an audience member(s), etc.).

A media presentation device (e.g., STB) provided by a service provider (e.g., a cable television service provider, a satellite television service provider, an over the top service provider, a music service provider, a movie service provider, a streaming media provider, etc.) or purchased by a consumer may contain processing capabilities to monitor, store, and transmit tuning data (e.g., which television channels are tuned by the media presentation device at a particular time) back to the service provider, which can then aggregate and provide such return path data to an audience measurement entity (e.g., The Nielsen Company (US), LLC.) to analyze media presentation activity. Data transmitted from a media presentation device back to the service provider is referred to herein as return path data. Return path data includes tuning data. Tuning data is based on data received from the media presentation device while the media presentation device is on (e.g., powered on, switched on, and/or tuned to a media channel, streaming, etc.). Although return path data includes tuning data, return path data may not include data related to the user viewing the media corresponding to the media presentation device. Accordingly, return path data may not be able to be associated with specific viewers, demographics, locations, etc.

To determine aspects of media presentation data (e.g., which household member is currently consuming a particular media and the demographics of that household member), market researchers may perform audience measurement by enlisting a subset of the media consumers as panelists. Panelists or monitored panelists are audience members (e.g., household members, users, panelists, etc.) enlisted to be monitored, who divulge and/or otherwise share their media activity and/or demographic data to facilitate a market research study. An audience measurement entity typically monitors media presentation activity (e.g., viewing, listening, etc.) of the monitored panelists via audience measurement system(s), such as a metering device(s) and/or a local people meter (LPM). Audience measurement typically includes determining the identity of the media being presented on a media output device (e.g., a television, a radio, a computer, etc.), determining data related to the media (e.g., presentation duration data, timestamps, channel data, etc.), determining demographic information of an audience, and/or determining which members of a household are associated with (e.g., have been exposed to) a media presentation. For example, an LPM in communication with an audience measurement entity communicates audience measurement (e.g., metering) data to the audience measurement entity. As used herein, the phrase "in communication," including variances thereof, encompasses direct communication and/or indirect communication through one or more intermediary components and does not require direct physical (e.g., wired) communication and/or constant communication, but rather additionally includes selective communication at periodic or aperiodic intervals, as well as one-time events.

In some examples, metering data (e.g., including media presentation data) collected by an LPM or other meter is stored in a memory and transmitted via a network, such as the Internet, to a datastore managed by the audience measurement entity. Typically, such metering data is combined with additional metering data collected from a group of LPMs monitoring a group of panelist households. The metering data may include, but are not limited to, a number of minutes a household media presentation device was tuned to a particular channel, a number of minutes a household media presentation device was used (e.g., consumed) by a household panelist member and/or a visitor (e.g., a presentation session), demographics of the audience (which may be statistically projected based on the panelist data), information indicative of when the media presentation device is on or off, and/or information indicative of interactions with the media presentation device (e.g., channel changes, station changes, volume changes, etc.), etc. As used herein, a channel may be a tuned frequency, selected stream, an address for media (e.g., a network address), and/or any other identifier for a source and/or carrier of media.

In some examples, the audience measurement entity processes the collected and/or aggregated metering data for markets where a panel is maintained and obtains (e.g., from one or more service provider) return path data for markets where a panel is not maintained to generate a seed panel. A seed panel is a synthetic panel including monitored panelists and non-panelist selected to correspond to return path data homes (e.g., in-market return path data) and regional panel homes (e.g., over the air only panelists) and used as the basis for generation of synthetic respondent level data (e.g., representative of a group synthetic/virtual panelists) based on a similarity to the segment of the market that is not covered by return path data. These monitored panelists are selected from a panel (e.g., a national panel of metered users) based on a regional proximity to a designated market area, a similarity between demographics of the monitored panelists and demographics of the return path data audience location, household media characteristics (e.g., how the households receive television signals (cable, satellite, over-the-air radio, etc.)), a similarity between media consumption of the monitored panelists and the return path data audience, etc. As used herein, a return path data audience is represented by audience (e.g., viewer or listener) assigned return path data associated with a population (e.g., a universe of users) and/or location. As used herein, a seed panelist is a monitored panelist that has been selected to be included in a seed panel. As used herein, synthetic respondent level data or respondent level data is processed viewing data at the level of individual respondents. Synthetic respondent level data may include complete synthesized time records (e.g., at the quarter hour level, hour level, etc.) across each broadcasting day of all viewing session by individual family member and guest on individual metered media output devices in a home, and include the demographic data. As used here, a designated market area is a geographical area that defines a media market where synthetic respondent level data is produced.

In some examples, the audience measurement entity adjusts the seed panel to satisfy target ratings and/or target reach. As used herein, a rating is an average percentage of a population exposed to media across a set time interval. As used herein, reach is a cumulative percentage or total of a population that has been counted as a viewer of the media at least once during a specified time interval (e.g., hourly, daily, weekly, monthly, etc.). Examples disclosed herein adjust the seed panel by adjusting weights of seed panelists corresponding to the target rating and/or reach until the target rating and/or reach is satisfied. For example, if the target rating is 25% of men exposed to a first program during a first duration of time and 30% of the generated seed panel men were exposed to the first program during the first duration of time, the audience measurement entity may adjust the seed panel to reduce the current rating (e.g., 30%) for that demographic, to a rating closer to the target rating (e.g., 25%). The audience measurement entity may use the adjusted seed panel to generate media exposure data based on marginal data (e.g., quarter hours, hours, days, etc.). Such media exposure data may include a total number of seed panelists exposed to the media at the different marginals, a total population of audience members exposed to the media at the marginals, a total number of deduplicated seed panelists exposed to the media (e.g., an audience reach) from all of the different marginal ratings (e.g., probabilities), and a total population size (e.g., universe estimate) of users that potentially could be exposed to the media. As used herein, a marginal rating corresponds to a probability that a person in the universe of people was exposed to media for a particular duration of time. As used herein, a recorded audience refers to monitored panelists exposed to media and a population audience represent the total population of people (e.g., monitored panelists and other unmonitored media consumers associated with return path data) exposed to the media.

Examples disclosed herein receive the marginal media exposure data (e.g., different episodes of a television series, different quarter hour time slots of a television program, or a radio program, etc.) for different unions of marginal data and/or smaller unions and estimates a population reach across all of the different unions. As used herein, a union can be made up of smaller unions (e.g., a union of smaller unions of marginals, such as a union of smaller unions of time-periods) and/or individual marginals (e.g., time-periods, such as quarter hours). For example, a first union may include a first quarter hour marginal and a second subsequent quarter hour marginal, a second union may include a third, fourth, and fifth quarter hour marginal, and a third union may include the first union and the second union. As used herein, child unions or children are the marginal time intervals and/or smaller unions that make up a larger union and a parent union or a parent is a larger union that includes the child union(s) and/or children. Using the above example, the children of the first union include the first quarter hour marginal and the second quarter hour marginal and the parent of the first union is the third union.

Traditional techniques of determining the total population reach for a union of marginal media ratings data include numerical calculations that enumerate all combinations in which someone can watch a program based on the individual marginal media ratings of making up the union. The number of probabilities to be solved by such traditional techniques is $2^n$ number of probabilities, where n is the number of marginal probabilities provided in the marginal ratings data (e.g., the ratings for the different possible instances of media exposure) of each union. For example, if reach is to be calculated across 4 quarter hours (e.g., for an hour-long media exposure), which corresponds to four possible marginal ratings, the total number of probabilities to be solved using such a traditional technique is 16 (e.g., $2^4$). If the reach is to be calculated across 96 quarter hours (e.g., a day-long media exposure), the total number of probabilities to be solved using such a traditional technique is $8*10^{28}$ (e.g., $2^{96}$), thereby exceeding the memory limit and/or processing power of any existing computer. Examples disclosed herein alleviate such memory/processing resource problems associated with such a traditional technique by calculating the solution using the disclosed analytical process.

To estimate the total population reach of a union (e.g., population union reach), examples disclosed herein determine pseudo universe estimate(s) (e.g., a pseudo universe estimate of the monitored (also referred to as the recorded) audience and a pseudo universe estimate of the return path data (also referred to as the population) audience). A pseudo universe corresponds to what the size of the universe of individuals capable of being in a given audience would need to be to achieve the ratings and reach values for that audience if the different marginal ratings are assumed to be independent, regardless of how much dependence actually exists. For example, when the universe of a recorded audience is equal to the pseudo universe value, then the total reach of the recorded audience can be calculated from the audience marginal ratings assuming they are independent. However, if there is a difference between the pseudo universe of the recorded audience and the actual universe of the recorded audience, the audience marginal ratings are dependent. Examples disclosed herein (A) access marginal ratings for the recorded audience, marginal ratings for the population audience, reach for the recorded audience, and total population size (e.g., the actual universe estimate) and (B) determine pseudo universe estimates to solve a system of equations resulting in the population audience reach for each union. The system of equations includes a link tool (e.g., a link equation) which is based on the pseudo universe estimates to link the dependency of the population audience marginal ratings to dependencies exhibited by the recorded audience marginal ratings. In this manner, examples disclosed herein determine the population audience reach from the marginal ratings for different unions, in a manner that takes into account the dependency among the different marginal ratings.

Examples disclosed herein use the below system of Equations (e.g., Equations 1-3), to determine the total population reach for a given union (j).

$$1 - \frac{A_{\{j\}}}{Q^R_{\{j\}}} = \prod_{k \in C(\{j\})} \left(1 - \frac{A_{\{k\}}}{Q^R_{\{j\}}}\right), \forall j = 1, \ldots, m \quad \text{(Equation 1)}$$

$$\frac{Q^R_{\{j\}} - A_{\{j\}}}{Q^P_{P\{j\}} - A_{\{j\}}} = \frac{Q^P_{\{j\}} - X_{\{j\}}}{Q^P_{P\{j\}} - X_{\{j\}}}, \forall j = 1, \ldots, m \quad \text{(Equation 2)}$$

$$1 - \frac{X_{\{j\}}}{Q^P_{\{j\}}} = \prod_{k \in C(\{j\})} \left(1 - \frac{X_{\{k\}}}{Q^P_{\{j\}}}\right), \forall j = 1, \ldots, m \quad \text{(Equation 3)}$$

In the preceding equations, UE is the actual universe estimate (e.g., the total population size), $A_{\{j\}}$ is the total recorded audience reach of the jth union, $Q^R_{\{j\}}$ is the pseudo universe estimate of the recorded audience at the jth union, m is the number of unions, $C_{\{j\}}$ is a child union of the jth union, $X_{\{j\}}$ is the total population union reach of the jth union, $Q^P_{\{j\}}$ is the pseudo universe estimate of the population audience for the jth union, and $Q^P_{P\{j\}}$ is the pseudo universe estimate of the population audience for the parent of the jth union. If the jth union does not have a parent, the universe estimate is applied as the parent. Additionally, if the jth union does not have a parent, the pseudo-universe estimate is either the universe estimate (e.g., for counts) or 1 (100%) (e.g., for proportions). Equation 1 defines the pseudo universe estimates of the recorded audience and Equation 3 defines the pseudo universe estimates of the population audience. The pseudo universe estimates of the recorded audience and the population audience of Equations 1 and 3 represent what the sizes of the respective recorded and population audiences would need to be for the respective marginal ratings to yield the corresponding reach values if there was independence between the different marginal ratings. Equation 2 is the link between the independency assumption and the actual dependency exhibited by the recorded population.

Examples disclosed herein determine the population union reach for a given union (e.g., the population union reaches) by determining initial estimates of the population union reaches $(X_{\{j\}})$ and applying the initial estimates to Equations 1-3 resulting in some error. Examples disclosed herein adjust the population union reach estimates until the error is sufficiently reduced to an acceptable level. Initially, examples disclosed herein determine the initial pseudo universe estimates for the recorded audience for different unions $(Q^R_{\{j\}})$ by applying the recorded audience reaches for each margin $(A_{\{j\}})$ to Equation 1. Once the initial pseudo universe estimates for the recorded audience for each union has been determined, examples disclosed herein determine the initial pseudo universe estimate for the population audience $(Q^R_{\{j\}})$ for each union by applying the population union reach estimates and the initial pseudo universe estimate for the recorded audience in Equation 2. Once the initial pseudo universe estimates for the population audience is determined, examples disclosed herein apply the determined pseudo universe estimates for the population audience and the population union reach estimates to Equation 3 to identify an error of the population union reach estimates. The error corresponds to an amount of deviation between a relationship (e.g., expression) of the right side of Equation 3 and a relationship of the left side of Equation 3 (e.g., the difference between the right side and the left side). For example, if the right side is equal to the left side (e.g., the difference is zero), the error of the corresponding population union reach is zero. When the error is above an error threshold, examples disclosed herein adjust the population union reach estimates to reduce the error. Examples disclosed herein continues this iterative process while adjusting the population union reach, until the population union reach converge to value(s) that satisfy the error threshold.

In some examples disclosed herein the population reach estimates are checked to verify their consistency. A population reach estimate(s) may be inconsistent when, for example, the reach estimate of the union is less than the reach of any of the children of the union. Additionally, a reach estimate may be inconsistent when, for example, the reach estimate of the union is more than the sum of the reaches of the children or the universe estimate. Examples disclosed herein adjust population reach estimates to ensure consistency. Using examples disclosed herein, reach across a nearly infinite number of time-periods for nearly an infinite number of unions may be calculated.

Figure 1:
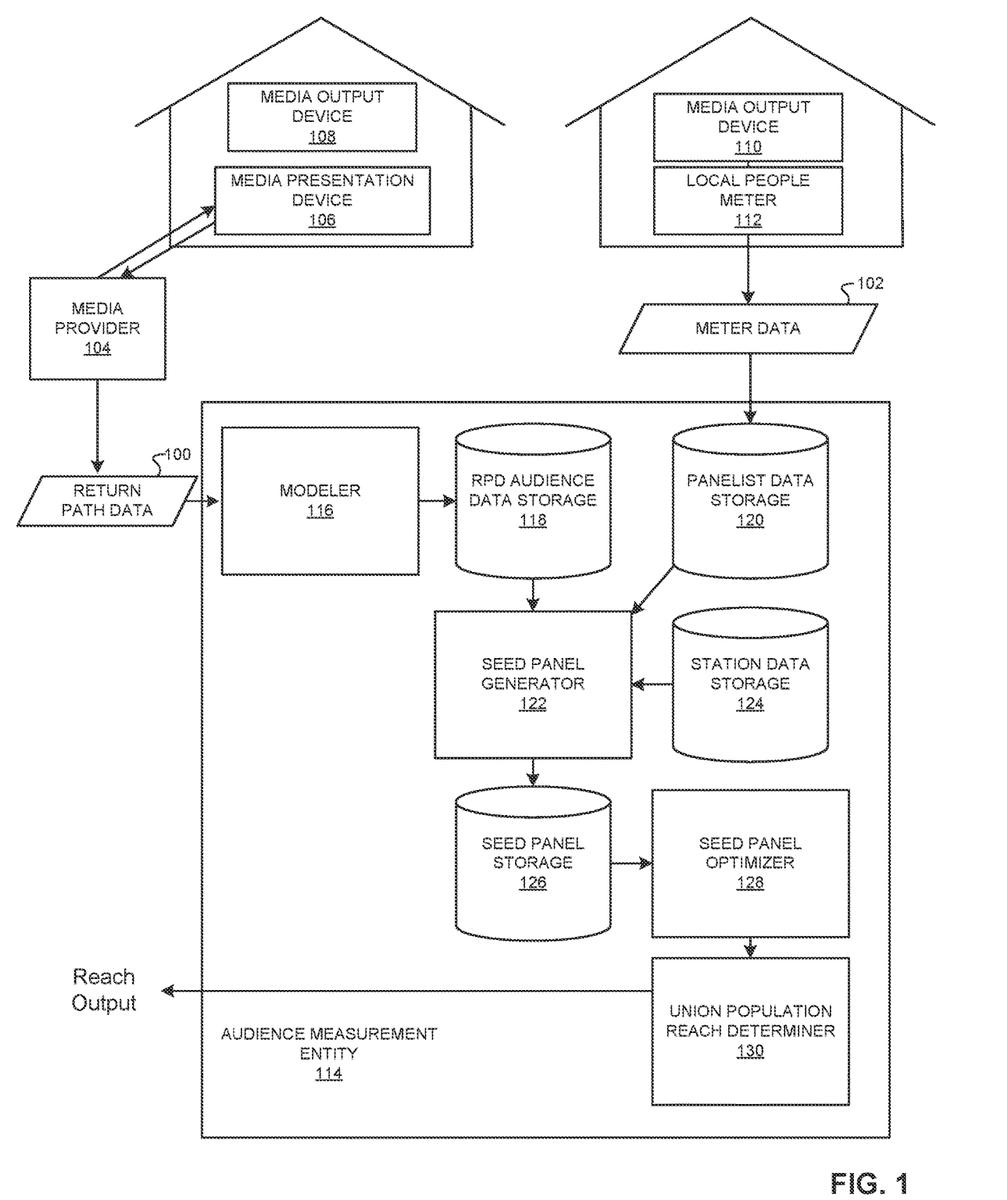
FIG. 1 is a block diagram of an example environment in which return path data and meter data are collected from media presentation locations and are analyzed by an example audience measurement entity to estimate media reach for a population for different unions of audience marginal ratings data.

FIG. 1 is a block diagram of an environment in which example return path data 100 and example meter data 102 are collected to determine reach based on marginal ratings data unions. FIG. 1 includes the example return path data 100, the example meter data 102, an example media provider 104, an example media presentation device 106, example media output devices 108, 110, an example local people meter (LPM) 112, and an example audience measurement entity (AME) 114. The example audience measurement entity 114 includes an example modeler 116, an example return path data (RPD) audience storage 118, an example panelist data storage 120, an example seed panel generator 122, an example station data storage 124, an example seed panel storage 126, an example seed panel optimizer 128, and an example union population reach determiner 130.

The example media provider 104 of FIG. 1 is a service provider (e.g., cable media service provider, a radio frequency (RF) media provider, a satellite media service provider, etc.) that presents media to an audience member via the example media presentation device 106. The media provided by the example media provider 104 is transmitted (e.g., via a wired or wireless network connection) to the media presentation device 106. The media presentation device 106 is connected, via a wired or wireless connection, to the example media output device 108 to output the media to an audience member. The media output device 108 is a device capable of outputting the received media. For example, the media output device 108 may be a television, a radio, speakers, a projector, a computer, a computing device, a tablet, a mobile device, and/or any other device capable of outputting media.

When the example media presentation device 106 of FIG. 1 is on, the media presentation device 106 receives media corresponding to a station, program, website, etc, based on the tuning of the example media presentation device 106. For example, the media presentation device 106 may be a set-top box. Additionally or alternatively, the example media presentation device 106 may be an over the top device, a video game console, a digital video recorder (DVR), a digital versatile disc (DVD) player, a receiver, a router, a server, a computer, a mobile device, and/or any device that receives media from a service provider. In some examples, the media presentation device 106 may implement a DVR and/or DVD player. In some examples, the example media presentation device 106 includes a unique serial number that, when associated with subscriber information, allows an audience measurement entity, a marketing entity, and/or any other entity to ascertain specific subscriber behavior information.

By way of example, the example media presentation device 106 may be tuned to channel 5. In such an example, the media presentation device 106 outputs media (from the example media provider 104) corresponding to the tuned channel 5. The media presentation device 106 may gather tuning data corresponding to which channels, stations, websites, etc., that the example media presentation device 106 was tuned. The example media presentation device 106 generates and transmits the example return path data 100 to the example media provider 104. The example return path data 100 includes the tuning data and/or data corresponding to the example media provider 104. Although the illustrated example of FIG. 1 includes the example media provider 104 receiving the example return path data 100 from one media presentation device (e.g., the example media presentation device 106), at one location, corresponding to one media provider (e.g., the example media provider 104), the example media provider 104 may receive return path data 100 from any number or type(s) of media presentation devices, at any number of locations. The media provider 104 transmits the collected return path data 100 to the example audience measurement entity 114. Additionally or alternatively, the audience measurement entity 114 may be hosted by any other entity or may be co-hosted by another entity(ies). For example, the example return path data 100 may be collected from the example media presentation devices 106 by a media provider (e.g., a cable television provider, a satellite television provider, etc.) and the example meter data 102 may be collected from an LPM (e.g., such as the example LPM 112) by the example audience measurement entity 114 cooperating with the media provider to gain access to the tuning data. The example audience measurement entity 114 includes the example return path data audience storage 118 (e.g., a database) and the example panelist data storage 120 (e.g., a database).

The example media output device 110 of FIG. 1 is a device capable of outputting the received media. For example, the media output device 110 may be a television, a radio, speakers, a projector, a computer, a computing device, a tablet, a mobile device, and/or any other device capable of outputting media. In some examples, the media output device 110 receives media over-the-air. In this manner, the media output device 110 receives media via an antenna and does not correspond to a media provider (e.g., including the example media provider 104). In the illustrated example of FIG. 1, the media output device 110 corresponds to one or more monitored panelists. The example LPM 112 monitors the panelists exposure to media output by the example media output device 110. For example, the example LPM 112 is in communication with the example media output device 110 to collect and/or capture signals emitted externally by the media output device 110. The LPM 112 may be coupled with the media output device 110 via wired and/or wireless connection. The example LPM 112 may be implemented in connection with additional and/or alternative types of media presentation devices, such as, for example, a radio, a computer monitor, a video game console, and/or any other device capable to present media to a user. The LPM 112 may be a portable people meter, a cell phone, a computing device, a sensor, and/or any other device capable of metering (e.g., monitoring) user exposure to media. In some examples, a media presentation location may include a group of LPMs 112. In such examples, the group of the LPMs 112 may be used to monitor media exposure for multiple users and/or media output devices 110. Additionally, the example panelist data storage 120 receives and stores the example meter data 102 from the example LPM 112.

In some examples, the example LPM 112 of FIG. 1 includes a set of buttons assigned to audience members to determine which of the audience members is watching the example media output device 110. The LPM 112 may periodically prompt the audience members via a set of LEDs, a display screen, and/or an audible tone, to indicate that the audience member is present at a first media presentation location by pressing an assigned button. In some examples, to decrease the number of prompts and, thus, the number of intrusions imposed upon the media consumption experience of the audience members, the LPM 112 prompts only when unidentified audience members are located at the first media presentation location and/or only after the LPM 112 detects a channel change and/or a change in state of the media output device 110. In other examples, the LPM 112 may include at least one sensor (e.g., a camera, 3-dimensional sensor, etc.) and/or be communicatively coupled to at least one sensor that detects a presence of the user in a first example media presentation location. The example LPM 112 transmits the example meter data 102 to a media researcher and/or a marketing entity. The example meter data 102 includes the media presentation data (e.g., data related to media presented while the media output device 110 is on and a user is present). The example meter data 102 may further include a household identification, a tuner key, a presentation start time, a presentation end time, a channel key, etc. Although the illustrated example illustrates the example audience measurement entity 114 collecting the example meter data 102 from one LPM 112 at one location, the example audience measurement entity 114 may collect meter data from any number or type of meters at any number of locations.

The example return path data 100 of FIG. 1 from the example media presentation device 106 and/or the example meter data 102 from the example LPM 112 is transmitted to the example audience measurement entity 114 via a network. The network may be implemented using any type of public or private network, such as, but not limited to, the Internet, a telephone network, a local area network (LAN), a cable network, and/or a wireless network. To enable communication via the network, the example media presentation device 106 includes a communication interface that enables a connection to an Ethernet, a digital subscriber line (DSL), a telephone line, a coaxial cable, or any wireless connection, etc.

The example modeler 116 of the example AME 114 of FIG. 1 collects the example return path data 100 corresponding to the example media presentation device(s) 106. As described above, the example return path data 100 includes tuning data of the example media presentation device 106. However, the example return path data 100 may not include specific data identifying any information relating to the audience of the example media output device 108. The example modeler 116 models such audience information. For example, the modeler 116 may assign and/or model virtual users to augment the example return path data 100, thereby generating audience assigned return path data. The example modeler 116 outputs the audience assigned return path data to the example return path data audience storage 118.

The example seed panel generator 122 of FIG. 1 gathers (A) the audience assigned return path data from the example return path data audience storage 118, (B) the example meter data 102 from the example panelist data storage 120, (C) and station data from the example station data storage 124 to generate a seed panel. As explained above, a seed panel is a panel including synthetic respondent level data from a set of monitored panelists corresponding to the LPM(s) 112 based on a return path data audience and/or homes. The seed panelists are selected to represent the return path data audience and/or homes. The example seed panel generator 122 assigns geography and income data to the persons and/or homes corresponding to the audience assigned return path data and the meter data 102. The example seed panel generator 122 initiates the seed panel by selecting monitored panelists to be representative of the viewer/geography/income assigned return path data audience. For example, a monitored panelist may be selected based on a similarity between (A) the location of the monitored panelist and the location of a return path data audience member, (B) demographics corresponding to the location of the return path data audience member and the demographics of the monitored panelist, (C) media viewing characteristics of the return path data audience and the monitored panelist, etc. The example station data storage 124 stores data related to station receivability by county. The example seed panel generator 122 uses the station data to calculate the station receivability for over the air homes. In some examples, the seed panel generator 122 filters the seed panelists to collect attributes of interest at the person level and/or the household level. Attributes of interest at the person level may include age, gender, ethnicity, nationality, race, etc., and attributes at the household level may include head of household data, cable data, single set data, ADS data, county data, metro data, income, zip code, number of televisions, pay service data, etc. The example seed panel generator 122 weights the seed panelists according to the universe estimate(s) of the designated market area. The example seed panel generator 122 stores the final seed panel in the example seed panel storage 126. The final seed panel includes synthetic respondent level data associated with the seed panel.

The example seed panel optimizer 128 of FIG. 1 adjusts the seed panel generated by the example seed panel generator 122 to satisfy target ratings and/or target household ratings based on constraints. Such constraints may include audience constraints, including quarter hour constraints, daypart constraints, daily constraints, weekly constraints, monthly constraints, etc. Such constraints may also include reach constraints, including daypart reach constraints, daily reach constraints, weekly reach constraints, monthly reach constraints, etc. In some examples, the seed panel optimizer 128 applies a discrete optimization greedy search to adjust the panels to satisfy the target ratings and/or target household ratings based on the constraints. The example seed panel optimizer 128 transmits the adjusted seed panel data with corresponding synthetic level data (e.g., data related to the media corresponding to the target rating) to the example union population reach determiner 130. The corresponding synthetic level data may include, for example, recorded audience marginal ratings of the media, population marginal ratings of the media, total reach of the recorded audience from marginal ratings, and a universe estimate. In some examples, parts of the synthetic level data may come from the adjusted seed panel and other parts may come from other data gathering devices and/or storage.

The example union population reach determiner 130 of FIG. 1 receives the recorded audience marginal ratings for different time-periods (e.g., quarter hours, half hours, hours, days, etc.) of the media, the population marginal ratings for the different marginals (e.g., time periods) of the media, the total reach of the recorded audience from the different marginal ratings, and a total population size (e.g., the universe estimate) from one or more device. Additionally, the example union population reach determiner 130 receives union data related to unions of the different marginals. The unions may be generated based on user and/or manufacturer preferences. For example, the example union population reach determiner 130 may receive unions representative of half hour, hour, daypart, and/or any combination of time interval corresponding to some or all of the quarter hours for a particular day. In some examples, a union may include multiple unions. For example, union ABCD may be a union of union AB and union CD, where union AB is a union of a marginal A and marginal B and union CD is a union of marginal C and marginal D. Each union may have a corresponding child and parent. Using the above example, the parent of union AB is union ABCD and the children of union AB are A and B. Each union corresponds to a union reach (e.g., a deduplicated number of people exposed to media across all marginals in the union). The example union population reach determiner 130 determines the population union reaches of each union based on the recorded audience ratings for the different marginals, the population audience ratings for the different marginals, the recorded reach of the different unions, and the universe estimate. The example union population reach determiner 130 determines the population union reaches of each union based using Equations 1-3 above, thereby reducing memory and/or processing resources associated with the traditional numerical calculation. The example union population reach determiner 130 outputs the reach output to another device and/or user. The example union population reach determiner 130 is further described in conjunction with FIG. 2.

Figure 2:
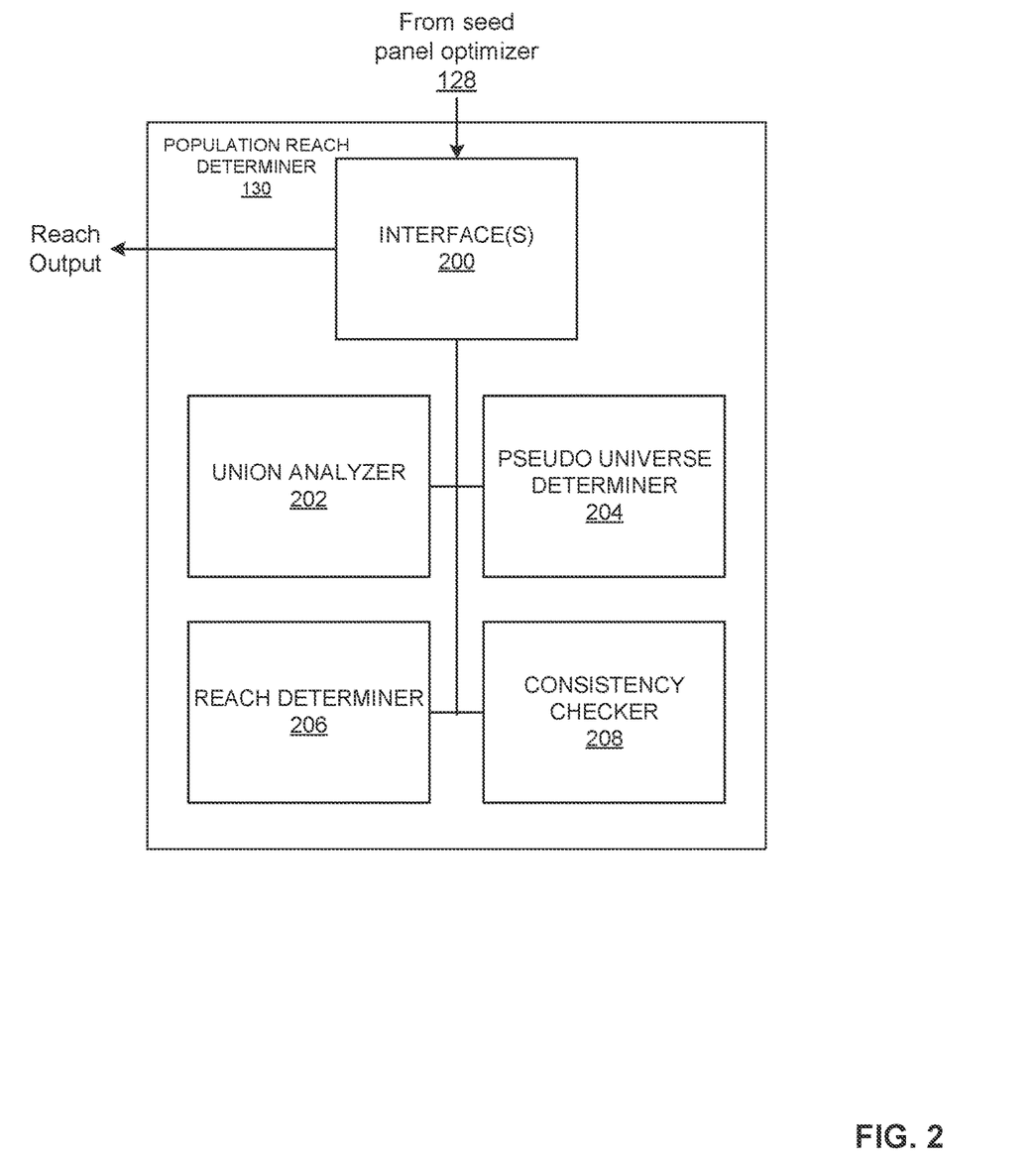
FIG. 2 is a block diagram of an example implementation of an example union population reach determiner included in the example environment of FIG. 1.

FIG. 2 is a block diagram of an example implementation of the example union population reach determiner 130 of FIG. 1 to determine population reach for given media based on unions of marginal ratings data. The example union population reach determiner 130 includes an example interface(s) 200, an example union analyzer 202, an example pseudo universe determiner 204, an example reach determiner 206, and an example consistency checker 208. Although the example union population reach determiner 130 is described in conjunction with data generated by the example seed panel optimizer 128 of FIG. 1, the example union population reach determiner 130 may determine reach based on information provided by any device that is capable of inputting audience marginal ratings, population marginal ratings, audience reach from the unions, and universe estimates. For example, the example union population reach determiner 130 may determine from different programs, stores visits for different stores, website visits, etc.

The example interface(s) 200 of FIG. 2 receives recorded audience marginal ratings corresponding to media for two or more marginals (e.g., quarter hours), population audience marginal ratings corresponding to the media for the two or more marginals, total recorded audience reach for the two or more marginal ratings, and a universe estimate of users. As described above, although the illustrated example of FIGS. 1 and 2 include the example seed panel optimizer 128 providing such data, the data may come from any data providing device and/or may correspond to any type of data related to media exposure at different marginals. In some examples, the example interface(s) 200 may receive unions from the seed panel optimizer 128 and/or another device. A union includes a total number of recorded audience members that have been exposed to the media across the marginals that make up the union (e.g., the recorded union reach). In the illustrated example, the marginals are broken up into quarter hours. For example, the recorded and/or population audience marginal ratings may correspond to four quarter hour marginals of an hour media program. However, the marginals may be broken up into any increments of time. Additionally, the example interface(s) 200 may output an estimated population reach for each union to another device/system and/or as a report to a user.

The example union analyzer 202 of FIG. 2 analyzes the unions to identify their parent and children unions. For example, if the received union includes three unions, union A, B, and C, where union A is a union of marginals 1 and 2, union B is a union of marginals 3 and 4, and union C is a union of unions A and B, then the union analyzer 202 determines that union A has two children (e.g., marginal 1 and marginal 2) and one parent (e.g., Union C), union B has two children (e.g., marginal 3 and marginal 4) and one parent (e.g., Union C), and union C has two children (e.g., union A and union B) and no parent. In such an example, the union analyzer 202 may use the universe estimate as the parent of union C.

The example pseudo universe determiner 204 of FIG. 2 determines pseudo universe estimates for both the recorded and population audiences as part of a process to determine a respective population reach for each received union. As described above, a pseudo universe estimate is a universe corresponding to what the size of the universe of individuals capable of being in a given audience would need to be to achieve the ratings and reach values for that audience if the different marginal ratings are assumed to be independent, regardless of how much dependence actually exists. The example pseudo universe determiner 204 determines recorded pseudo universe estimates and population pseudo universe estimates for each union to calculate the population reaches of the respective unions. As further described below in conjunction with FIG. 3, the example pseudo universe determiner 204 determines an initial pseudo universe estimate for the population audience for each union based on a recorded union reach estimate. In subsequent iterations, the initial pseudo universe of the population audience for each union is updated to adjust the population union reach estimate until the population union reach estimates converge to appropriate estimates (e.g., reach estimates that satisfy an error threshold).

The example reach determiner 206 of FIG. 2 estimates population union reaches and adjusts the population union reach estimates until the population reach estimates converge to an appropriate group of estimates. As described above, a population union reach is a deduplicated total audience corresponding to the total population audience of media across all analyzed marginals and/or children of a union. As further described below in conjunction with FIG. 3, the example reach determiner 206 initializes by selecting (e.g., estimating) a population reach for each union. In some examples, the selected population reaches are based on an assumption of independency among recorded audiences within the union. In subsequent iterations, the population union reaches are updated (e.g., adjusted) until the population reach estimates converge to appropriate estimates (e.g., within a margin of error).

The example consistency checker 208 of FIG. 2 checks the consistency of the population reach estimates of the received unions based on the population reach estimates of parents and children of each received union. A population reach estimate of a union may be inconsistent when, for example, the population reach estimate of the union is less than the population reach of any of the children of the union. Additionally or alternatively, a population reach estimate of a union may be inconsistent when, for example, the population reach estimate of the union is more than (A) the sum of the reaches of the children or (B) the universe estimate. The example consistency checker 208 identifies when one or more of the population reach estimates is inconsistent and flags the population reach estimates for the inconsistent unions. In some examples, the consistency checker 208 determines how to adjust the inconsistent population reach estimate(s) to assure a consistent result. The example consistency checker 208 is further described below in conjunction with FIGS. 4 and 5.

While an example manner of implementing the example union population reach determiner 130 of FIG. 1 is illustrated in FIG. 2, one or more elements, processes and/or devices illustrated in FIG. 2 may be combined, divided, re-arranged, omitted, eliminated and/or implemented in any other way. Further, the example interface 200, the example union analyzer 202, the example pseudo universe determiner 204, the example reach determiner 206, the example consistency checker 208, and/or, more generally, the example the example union population reach determiner 130, of FIG. 2 may be implemented by hardware, machine readable instructions, software, firmware and/or any combination of hardware, machine readable instructions, software and/or firmware. Thus, for example, any of the example interface 200, the example union analyzer 202, the example pseudo universe determiner 204, the example reach determiner 206, the example consistency checker 208, and/or, more generally, the example the example union population reach determiner 130, of FIG. 2 could be implemented by one or more analog or digital circuit(s), logic circuit(s), programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example interface 200, the example union analyzer 202, the example pseudo universe determiner 204, the example reach determiner 206, the example consistency checker 208, and/or, more generally, the example the example union population reach determiner 130, of FIG. 2 is/are hereby expressly defined to include a tangible computer readable storage device or storage disk such as a memory, a digital versatile disk (DVD), a compact disk (CD), a Blu-ray disk, etc., storing the software and/or firmware. Further still, the example union population reach determiner 130 of FIG. 2 may include one or more elements, processes and/or devices in addition to, or instead of, those illustrated in FIG. 2, and/or may include more than one of any or all of the illustrated elements, processes and devices.

Figure 3:
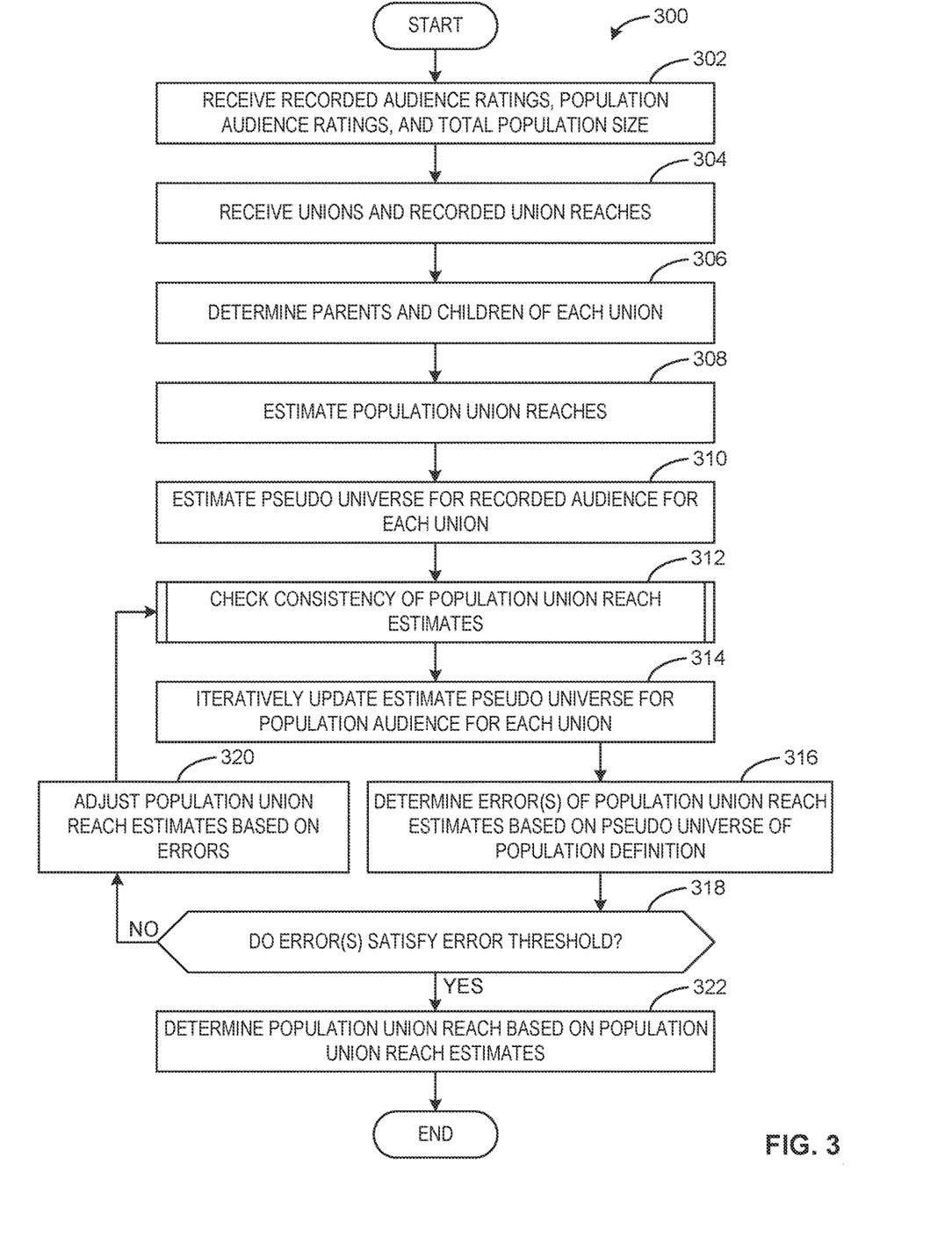
FIGS. 3-5 are flowcharts illustrating example machine readable instructions that may be executed to implement the example union population reach determiner of FIGS. 1 and/or 2.
Figure 4:
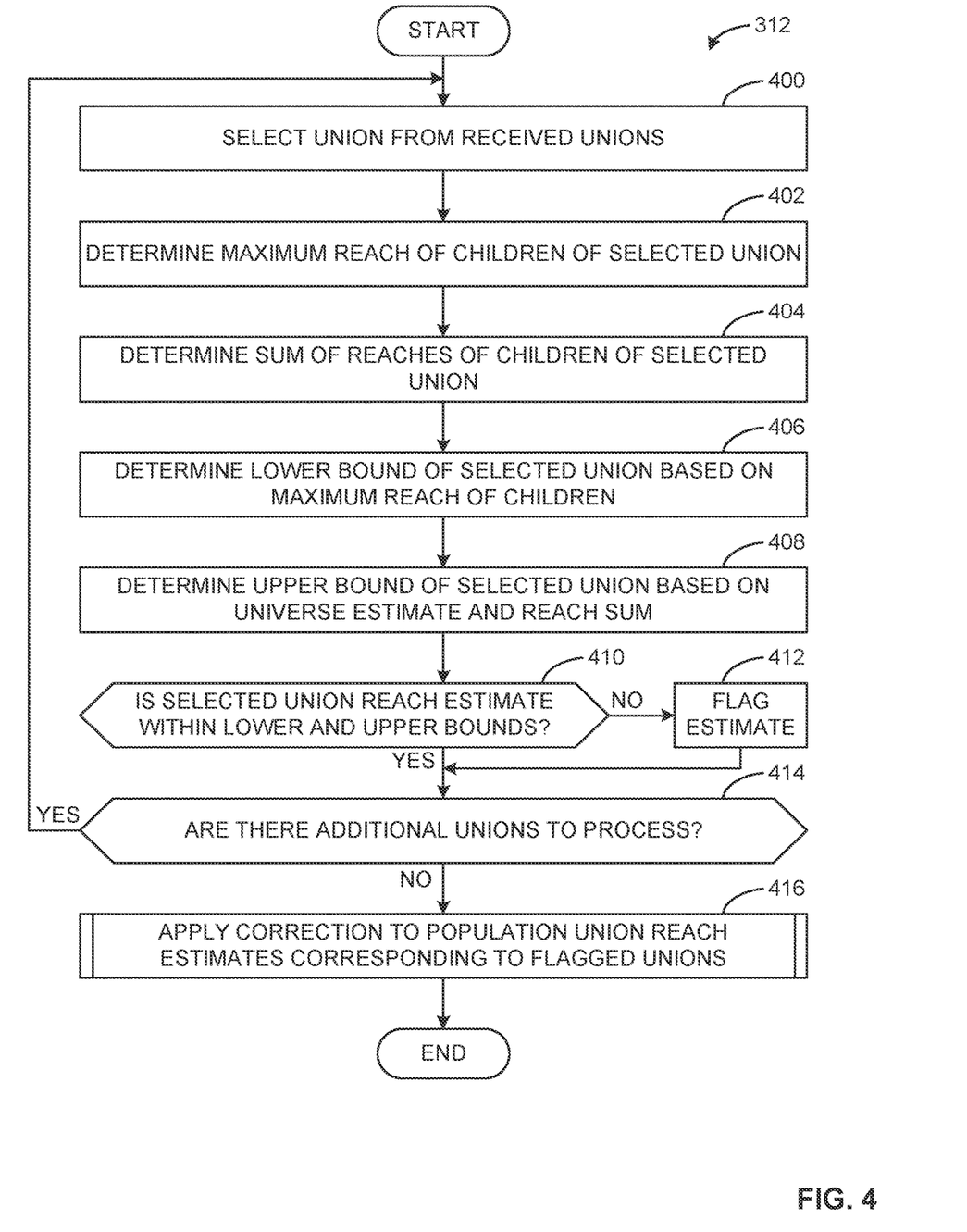
Figure 5:
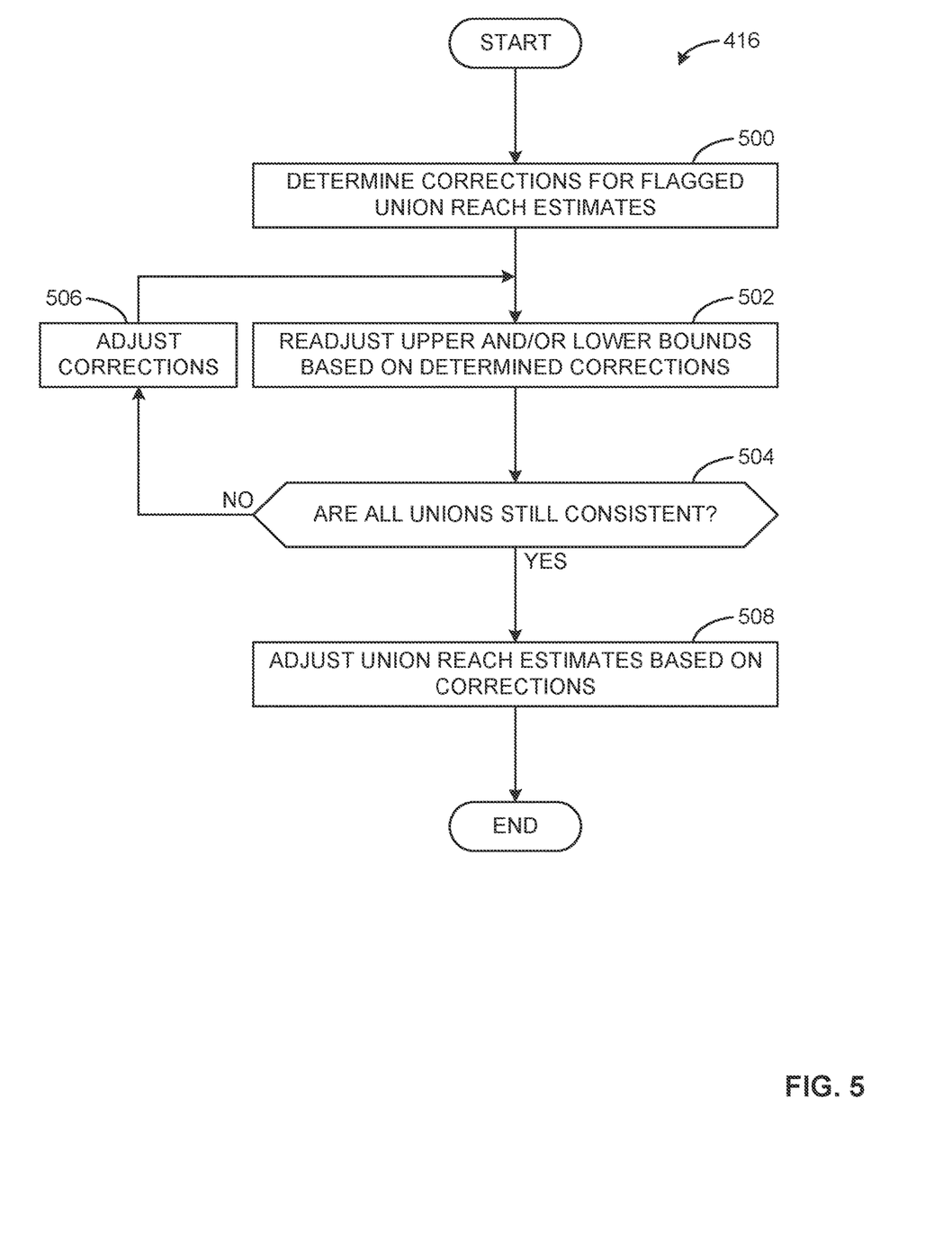

Flowcharts representative of example machine readable instructions for implementing the example union population reach determiner 130 of FIG. 2 are shown in FIGS. 3-5. In the examples, the machine readable instructions comprise a program for execution by a processor such as the processor 612 shown in the example processor platform 600 discussed below in connection with FIG. 6. The program may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowchart illustrated in FIG. 3, many other methods of implementing the example union population reach determiner 130 of FIG. 2 may alternatively be used. For example, the order of execution of the blocks may be changed, and/or some of the blocks described may be changed, eliminated, or combined.

As mentioned above, the example processes of FIGS. 3-5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any period (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 3-5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any period (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIG. 3 is an example flowchart 300 representative of example machine readable instructions that may be executed by the example union population reach determiner 130 of FIGS. 1 and 2 to generate respective population reach estimates for various unions. Although the instructions of FIG. 3 are described in conjunction with a population reach estimation based on received unions of media exposure from the example union population reach determiner 130 of FIGS. 1 and 2, the example instructions may be utilized to determine reach based on any type of media and/or union from any type of population union reach determiner. Although the example flowchart 300 is described in conjunction with a particular order of solving Equations 1-3, the instructions may be executed to solve equations in any order.

At block 302, the example interface 200 receives recorded audience marginal ratings, population audience marginal ratings, total recorded audience reach for different unions, and a total population size (e.g., a universe estimate). At block 304, the example interface(s) 200 receives unions and recorded union reaches. For example, the below example table (Table 1) includes input recorded audience ratings and reach data and population audience ratings data for an hour and a half program broken up into six quarter hour marginals, where the total recorded audience reach across the six increments of time is 929,404 persons, the universe estimate (E.g., total population size) is 1,000,000 persons, and there are five different unions.

TABLE 1

Example Data

| Marginals (where UE = 1,000,000) | Recorded audience ratings | Population audience ratings |
|---|---|---|
| A | 4,779 | 9,629 |
| B | 41,036 | 81,019 |
| C | 154,466 | 294,432 |
| D | 348,548 | 618,045 |
| E | 570,607 | 878,173 |
| F | 781,248 | 983,802 |

| Unions | Recorded union reach | Population union reach |
|---|---|---|
| (A, B) | 43,384 | $X_{AB}$ |
| (C, D) | 416,025 | $X_{CD}$ |
| (E, F) | 898,562 | $X_{EF}$ |
| (A, B, C, D) | 425,246 | $X_{ABCD}$ |
| (A, B, C, D, E, F) | 929,404 | $X_{ABCDEF}$ |

In the example of Table 1, UE is the universe estimate (e.g., total population), A is a marginal corresponding to the ratings for a first quarter hour, B is a marginal corresponding to the ratings for a second quarter hour, C is a marginal corresponding to the ratings for a third quarter house, D is a marginal corresponding to the ratings for a fourth quarter hour, E is a marginal corresponding to the ratings for a fifth quarter hour, F is a marginal corresponding to the ratings for a sixth quarter hour, (A,B) is a reach corresponding to the union of marginals A and B, (C,D) is a reach corresponding to the union of marginals C and D, (E,F) is a reach corresponding to the union of marginals E and F, (A,B,C,D) is a reach corresponding to the union of marginals A, B, C, and D, (A,B,C,D,E,F) is a reach corresponding to the deduplicated total recorded audience reach across A, B, C, D, E, and F (e.g., the total recorded reach), and $X_{AB}$-$X_{ABCDEF}$ are the respective population reaches for each of the unions. Alternatively, as explained above, A, B, C, D, E, and F may represent hours, days, stores, websites, etc.

At block 306, the example union analyzer 202 determines the parent and children of each received union. Using the example of Table 1, the example union analyzer 202 determines that union (A,B,C,D,E,F) does not have a parent (e.g., the parent corresponds to the universe estimate) and has children (A,B,C,D) and (E,F), union (A,B,C,D) has parent (A,B,C,D,E,F) and children (A,B) and (C,D), union (E,F) has parent (A,B,C,D,E,F) and children E and F, union (A,B) has parent (A,B,C,D) and children A and B, and union (C,D) has parent (A,B,C,D) and children C and D.

At block 308, the example reach determiner 206 estimates population audience union reaches for the received recorded audience union reaches. Using the example of Table 1, the example reach determiner 206 determines initial estimates the population union reaches $X_{ABCDEF}$, $X_{ABCD}$, $X_{EF}$, $X_{AB}$, $X_{CD}$ corresponding respectively to the for unions (A,B,C, D,E,F), (A,B,C,D), (E,F), (A,B), and (C,D). In some examples, the initial estimates of the population union reaches are based on assumed values that assume independency between children of the unions.

At block 310, the example pseudo universe determiner 204 estimates a pseudo universe for the recorded audience for each union. The example pseudo universe determiner 204 estimates a pseudo universe for the recorded audience for each union by entering the recorded union reach estimates into Equation 1. Using the example data of Table 1, the example pseudo universe determiner 204 applies the recorded union reach estimates to Equation 1 resulting in the below system of Equations 4-8.

$$1 - \frac{A_{(AB)}}{Q^R_{(AB)}} = \left(1 - \frac{A_{(A)}}{Q^R_{(AB)}}\right)\left(1 - \frac{A_{(B)}}{Q^R_{(AB)}}\right) \quad \text{(Equation 4)}$$

$$1 - \frac{A_{(CD)}}{Q^R_{(CD)}} = \left(1 - \frac{A_{(C)}}{Q^R_{(CD)}}\right)\left(1 - \frac{A_{(D)}}{Q^R_{(CD)}}\right) \quad \text{(Equation 5)}$$

$$1 - \frac{A_{(EF)}}{Q^R_{(EF)}} = \left(1 - \frac{A_{(E)}}{Q^R_{(EF)}}\right)\left(1 - \frac{A_{(F)}}{Q^R_{(EF)}}\right) \quad \text{(Equation 6)}$$

$$1 - \frac{A_{(ABCD)}}{Q^R_{(ABCD)}} = \left(1 - \frac{A_{(AB)}}{Q^R_{(ABCD)}}\right)\left(1 - \frac{A_{(CD)}}{Q^R_{(ABCD)}}\right) \quad \text{(Equation 7)}$$

$$1 - \frac{A_{(ABCDEF)}}{Q^R_{(ABCDEF)}} = \left(1 - \frac{A_{(ABCD)}}{Q^R_{(ABCDEF)}}\right)\left(1 - \frac{A_{(EF)}}{Q^R_{(ABCDEF)}}\right) \quad \text{(Equation 8)}$$

The example pseudo universe determiner 204 may use each of the Equations 4-8 to determine the respective pseudo universe estimates for the recorded audience for the respective union (e.g., $Q^R_{AB}$, $Q^R_{CD}$, $Q^R_{EF}$, $Q^R_{ABCD}$, $Q^R_{ABCDEF}$).

At block 312, the example union population reach determiner 130 checks the consistency of the population union reach estimates for each union. As described above in conjunction with FIG. 2, the example consistency checker 208 checks the consistency of the population union reaches for each union based on the population reach estimates of the children of the union, the population reach estimates of the parents of the union, and/or the universe estimate. Additionally, the example reach determiner 206 adjusts the population reach estimates based on the consistency check. The checking of the consistency of the population union reach estimates for each union is further described in conjunction with FIGS. 4 and 5.

At block 314, the example pseudo universe determiner 204 iteratively updates the estimated pseudo universe for the population audience for each union. The example pseudo universe determiner 204 updates the estimate pseudo universe for the population audience of each union using a system of equations corresponding to Equation 2. Using the example data of Table 1, the example pseudo universe determiner 204 applies the pseudo universe for the recorded audience reach for each union, and the recorded ratings, and the population union reach estimates of each union to Equation 2 resulting in the below system of Equations 9-13.

$$\frac{Q^R_{(AB)} - A_{(AB)}}{Q^P_{(ABCD)} - A_{(AB)}} = \frac{Q^P_{(AB)} - X_{(AB)}}{Q^P_{(ABCD)} - X_{(AB)}} \quad \text{(Equation 9)}$$

$$\frac{Q^R_{(CD)} - A_{(CD)}}{Q^P_{(ABCD)} - A_{(CD)}} = \frac{Q^P_{(CD)} - X_{(CD)}}{Q^P_{(ABCD)} - X_{(CD)}} \quad \text{(Equation 10)}$$

$$\frac{Q^R_{(EF)} - A_{(EF)}}{Q^P_{(ABCDEF)} - A_{(EF)}} = \frac{Q^P_{(EF)} - X_{(EF)}}{Q^P_{(ABCDEF)} - X_{(EF)}} \quad \text{(Equation 11)}$$

$$\frac{Q^R_{(ABCD)} - A_{(ABCD)}}{Q^P_{(ABCDEF)} - A_{(ABCD)}} = \frac{Q^P_{(ABCD)} - X_{(ABCD)}}{Q^P_{(ABCDEF)} - X_{(ABCD)}} \quad \text{(Equation 12)}$$

$$\frac{Q^R_{(ABCDEF)} - A_{(ABCDEF)}}{UE - A_{(ABCDEF)}} = \frac{Q^P_{(ABCDEF)} - X_{(ABCDEF)}}{UE - X_{(ABCDEF)}} \quad \text{(Equation 13)}$$

The example pseudo universe determiner 204 may use each of the Equations 9-13 to determine the respective pseudo universe estimates for the population audience for the respective unions (e.g., $Q^P_{AB}$, $Q^P_{CD}$, $Q^P_{EF}$, $Q^P_{ABCD}$, $Q^P_{ABCDEF}$).

At block 316, the example pseudo universe determiner 204 determines error(s) of the population union reach estimates based on the definition of the pseudo universe of the population (e.g., Equation 3). Using the example data of Table 1, the example pseudo universe determiner 204 applies the pseudo universe for the recorded audience for each union, and the recorded audience ratings/reach, the population union reach estimates of each union to the system of equations corresponding to Equation 3 resulting in the below system of Equations 14-18.

$$1 - \frac{X_{(AB)}}{Q^P_{(AB)}} = \left(1 - \frac{X_{(A)}}{Q^P_{(AB)}}\right)\left(1 - \frac{X_{(B)}}{Q^P_{(AB)}}\right) \quad \text{(Equation 14)}$$

$$1 - \frac{X_{(CD)}}{Q^P_{(CD)}} = \left(1 - \frac{X_{(C)}}{Q^P_{(CD)}}\right)\left(1 - \frac{X_{(D)}}{Q^P_{(CD)}}\right) \quad \text{(Equation 15)}$$

$$1 - \frac{X_{(EF)}}{Q^P_{(EF)}} = \left(1 - \frac{X_{(E)}}{Q^P_{(EF)}}\right)\left(1 - \frac{X_{(F)}}{Q^P_{(EF)}}\right) \quad \text{(Equation 16)}$$

$$1 - \frac{X_{(ABCD)}}{Q^P_{(ABCD)}} = \left(1 - \frac{X_{(AB)}}{Q^P_{(ABCD)}}\right)\left(1 - \frac{X_{(CD)}}{Q^P_{(ABCD)}}\right) \quad \text{(Equation 17)}$$

$$1 - \frac{X_{(ABCDEF)}}{Q^P_{(ABCDEF)}} = \left(1 - \frac{X_{(ABCD)}}{Q^P_{(ABCDEF)}}\right)\left(1 - \frac{X_{(EF)}}{Q^P_{(ABCDEF)}}\right) \quad \text{(Equation 18)}$$

The example pseudo universe determiner 204 determines the error(s) corresponding to the population union reach estimates based a difference between the right hand sides of Equations 14-17 to the left hand sides of Equations 14-17. For example, if the right hand side of Equation 14 is the same as the left hand side of Equation 17, the example pseudo universe determiner 204 determines that the error of the population union reach corresponding with the (A,B) union is zero (e.g., no error).

At block 318, the example pseudo universe determiner 204 determines if the error(s) satisfy an error threshold. In some examples, the error threshold corresponds to an amount of acceptable error defined by a user and/or manufacturer. The error threshold may be set and/or adjusted to any value. In some examples, the example pseudo universe determiner 204 determines that the error satisfies the error threshold when the error of each of the population union reach estimates is at or below the error threshold. If the example pseudo universe determiner 204 determines that the error(s) do not satisfy the error threshold (block 318: NO), the example reach determiner 206 adjusts the population union reach estimates based on the error(s) (e.g., to lower the error(s)) (block 320). After the example reach determiner 206 adjusts the population union reach estimates, the process returns to block 312 to continue until the error is sufficiently reduced to satisfy the error threshold.

If the example pseudo universe determiner 204 determines that the error(s) satisfy the error threshold (block 318: YES), the example reach determiner 206 determines the population reach of the unions based on the population reach union estimates (block 322).

FIG. 4 is an example flowchart 312 representative of example machine readable instructions that may be executed to implement the example union population reach determiner 130 of FIGS. 1 and 2 to check consistency population union reach estimates, as described above in conjunction with block 312 of FIG. 3. Although the instructions of FIG. 4 are described in conjunction with the example union population reach determiner 130 of FIGS. 1 and 2, the example instructions may be utilized by any type of population reach determiner.

At block 400, the example consistency checker 208 selects a union of the received unions. At block 402, the example consistency checker 208 determines the maximum population reach of the children of the selected union. For example, using Table 1, if the selected union is (A,B,C,D), the example consistency checker 208 determines the maximum population reach of the children of (A,B,C,D) to be 416,025 (e.g., the max[(A,B), (C,D)]=max[43,384, 416,025]=416,025).

At block 404, the example consistency checker 208 determines the population reach sum of the children of the selected union. For example, using the selected union (A,B,C,D) of Table 1, the example consistency checker 208 determines the population reach sum to be 459,409 (e.g., (A,B)+(C,D)=43,384+416,025=459,409). At block 406, the example consistency checker 208 determines the lower bound of the reach of the selected union based on the maximum population reach of the children corresponding to the selected union. For example, using the selected union (A,B,C,D) of Table 1, the example consistency checker 208 determines the lower bound to be 416,025 (e.g., max[(A,B), (C,D)]=max(43,384, 416,025)=416,025). At block 408, the example consistency checker 208 determines the upper bound of the selected union based on the universe estimate and the population reach sum. In some examples, the consistency checker 208 determines the upper bound to be the minimum of the universe estimate and the population reach sum. For example, using the selected union (A,B,C,D) of Table 1, the example consistency checker 208 determines the upper bound to be 459,409 (e.g., the min(UE, reach sum)=min(1,000,000, 459,409)=459,409).

At block 410, the example consistency checker 209 determines if the population union reach estimate for the selected union is within the lower and upper bounds. For example, using the selected union (A,B,C,D) of Table 1, the example consistency checker 208 determines that a population union reach estimate for (A,B,C,D) of 500,000 is not within the lower and upper bounds, but a population union reach estimate of 450,000 is within the lower and upper bounds. If the example consistency checker 209 determines that the selected population union reach estimate is not within the lower and upper bounds (block 410: NO), the example consistency checker 208 flags the population reach estimate for the selected union (block 412). If the example consistency checker 209 determines that the selected union reach estimate is within the lower and upper bounds (block 410: YES), the example consistency checker 208 does not flag the population reach estimate for the selected union.

At block 414, the example consistency checker 208 determines if there are additional unions to be processed. If the example consistency checker 208 determines that there are additional unions to be processed (block 414: YES), the process returns to block 400 to check the consistency of the additional unions. If the example consistency checker 208 determines that there are no additional unions to be processed (block 414: NO), the example union population reach determiner 130 applies corrections to the population reach estimates corresponding to the flagged estimates (block 416), as further described below in conjunction with FIG. 5.

FIG. 5 is an example flowchart 416 representative of example machine readable instructions that may be executed to implement the example union population reach determiner 130 of FIGS. 1 and 2 to apply correction to population union reach estimates corresponding to flagged unions, as described above in conjunction with block 416 of FIG. 4. Although the instructions of FIG. 5 are described in conjunction with the example union population reach determiner 130 of FIGS. 1 and 2, the example instructions may be utilized by any type of population reach determiner.

At block 500, the example reach determiner 206 determines corrections (e.g., adjustments) for the flagged population union reach estimates (e.g., flagged by the example consistency checker 208). The corrections correspond to how much each flagged population union reach estimate should be increased or decreased to satisfy the lower and upper bounds of the union (e.g., as determined according to the example described above in connection with FIG. 4). The example reach determiner 206 may determine corrections to adjust the flagged population union reach estimates so that each flagged estimate equals the lower bound, the upper bound, or any value in between the lower and upper bounds (e.g., half way between the lower and upper bounds).

At block 502, the example consistency checker 208, readjusts the upper and/or lower bounds based on the determined corrections. The corrections, when applied to the reach estimates affect the upper and/or lower bounds of parent and/or children unions corresponding to the flagged population union reach estimates. Accordingly, the example consistency checker 208 readjusts (e.g., by re-executing the example FIG. 4 described above) the upper and/or lower bounds to verify that the corrections do not make the population union reach estimates inconsistent. At block 504, the example consistency checker 208 determines if all of the unions are still consistent. For example, the consistency checker 208 determines that the unions are or are not consistent as shown in the example flowchart 312 of FIG. 3.

If the example consistency checker 208 determines that the unions are not still consistent (block 504: NO), the example reach determiner 206 adjusts the determined corrections again to attempt to ensure that the unions will be consistent after applying the determined corrections (block 506). For example, if the correction corresponds to increasing a first population reach estimate of a first union by a value of 30 and decreasing a second population reach estimate of a second union by a value of 50, the example reach determiner 206 may adjust correlations to increase the first estimate by a value of 15 and decrease the second estimate by a value of 25. The example reach determiner 206 may adjust the corrections by any value or any percentage (e.g., 50% reduction of the determined corrections). The example reach determiner 206 may adjust all corrections by the same value or percentage or may adjust each correction by a distinct value of percentage. If the example consistency checker 208 determines that all of the unions are still consistent (block 504: YES), the example reach determiner 206 adjusts the union reach estimates based on the determined corrections (block 508).

Figure 6:
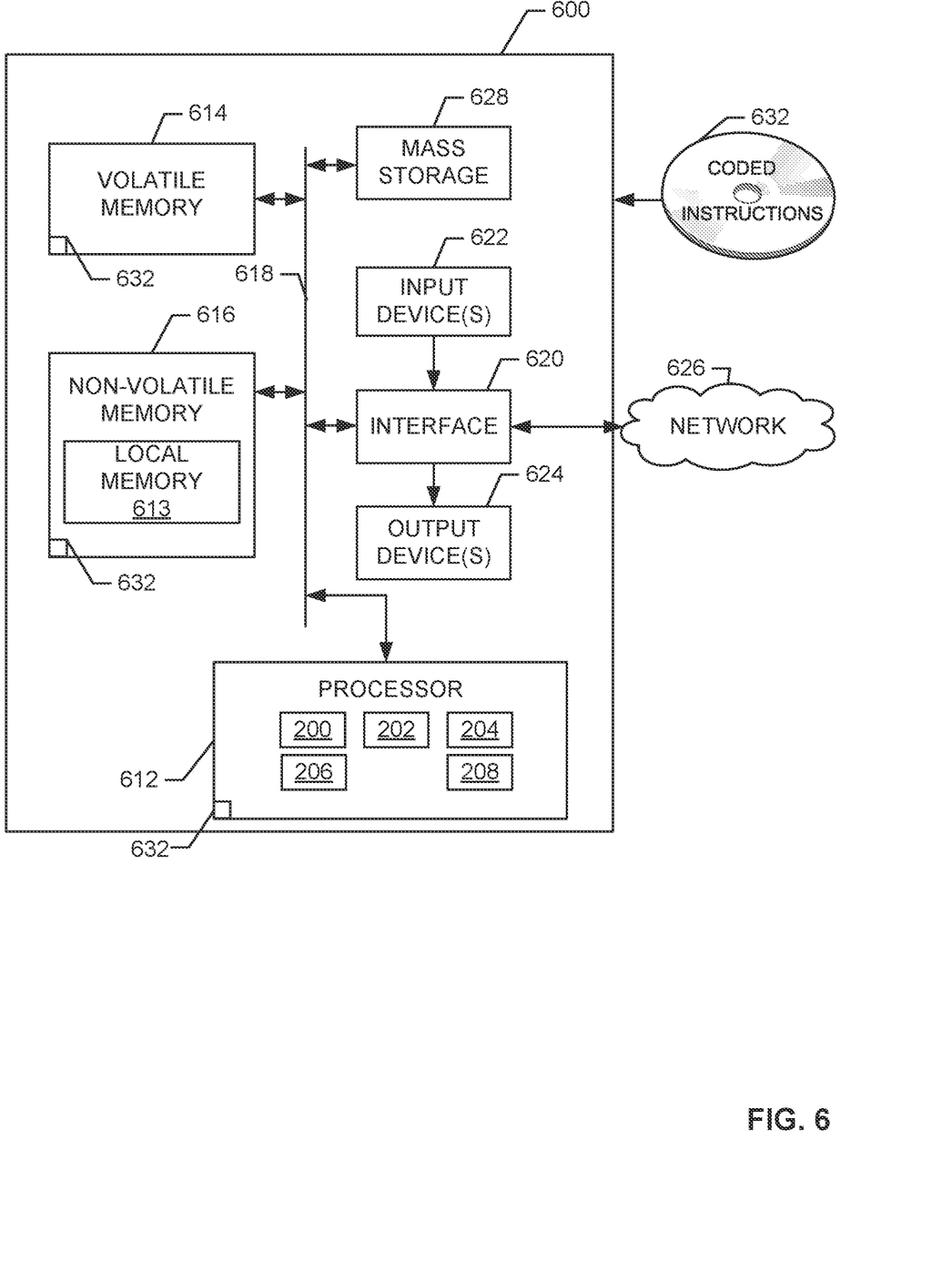
FIG. 6 is a block diagram of an example processing system structured to execute the example machine readable instructions of FIGS. 3, 4, and/or 5 to implement the example union population reach determiner of FIGS. 1 and/or 2.

FIG. 6 is a block diagram of an example processor platform 600 capable of executing the instructions of FIG. 3 to implement the example union population reach determiner 130 of FIG. 1. The processor platform 600 can be, for example, a server, a personal computer, a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by integrated circuits, logic circuits, microprocessors or controllers from any desired family or manufacturer.

The processor 612 of the illustrated example includes a local memory 613 (e.g., a cache). The example processor 612 of FIG. 6 executes the instructions of FIG. 3 to the example interface 200, the example union analyzer 202, the example pseudo universe determiner 204, the example reach determiner 206, and/or the example consistency checker 208 to implement the example seed panel generator 62 of FIG. 2. The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, a sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, and/or speakers). The interface circuit 620 of the illustrated example, thus, typically includes a graphics driver card, a graphics driver circuit or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

The coded instructions 632 of FIGS. 3-5 may be stored in the mass storage device 628, in the volatile memory 614, in the non-volatile memory 616, and/or on a removable tangible computer readable storage medium such as a CD or DVD.

From the foregoing, it should be appreciated that the above disclosed methods, apparatus, and articles of manufacture estimate population reach from marginal ratings. Example disclosed herein determine the reach analytically using the above Equations 1-3. Traditional techniques for determining reach across various unions include determining the reach numerically. However, such traditional techniques are unsolvable for a large number of marginals dues to memory and/or processing constraints. Examples disclosed herein alleviate the problems associated with such traditional techniques by demining the reach analytically (e.g., via solving the disclosed Equations 1-3 using a population reach union estimates). Using examples disclosed herein reach can be determined from a nearly infinity number of instances and/or unions of media exposure based on the marginal media exposure data.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. An audience measurement computing system comprising:
    at least one processor; and
    memory having stored therein instructions that, when executed by the at least one processor, cause the audience measurement computing system to perform a set of operations comprising:
        accessing media exposure data for each of multiple distinct unions of marginal ratings data, wherein accessing the media exposure data comprises receiving meter data from a group of meter devices via a network, wherein meter devices of the group of meter devices meter exposure to media at respective media presentation locations;
        determining, for each of the multiple distinct unions, a pseudo universe estimate of a recorded audience corresponding to the union based on the media exposure data for the union;
        determining, for each of the multiple distinct unions, an initial pseudo universe estimate of a population audience based on the pseudo universe estimate of the recorded audience;
        determining, for each of the multiple distinct unions, an initial population reach estimate based on the initial pseudo universe estimate of the population audience corresponding to the union;
        making a determination that the initial population reach estimate for a given one of the multiple distinct unions is inconsistent with the initial population reach estimates of one or more others of the multiple distinct unions that are related to the given one; and
        in response to making the determination that the initial population reach estimate for the given one of the multiple distinct unions is inconsistent, determining, for each of the multiple distinct unions, an updated pseudo universe estimate of the population audience based on the initial population reach estimate and the media exposure data for the union; and
        determining, for each of the multiple distinct unions, an updated population reach estimate based on the updated pseudo universe estimate of the population audience corresponding to the union.

2. The audience measurement computing system of claim 1, wherein the one or more others of the multiple distinct unions that are related to the given one as children of the given one.

3. The audience measurement computing system of claim 2, wherein the operations further include making the determination that the initial population reach estimate of the given one of the multiple distinct unions is inconsistent by:
    determining a lower bound based on a maximum value of the initial population reach estimates of the children of the given one; and
    evaluating that the initial population reach estimate of the given one is below the lower bound.

4. The audience measurement computing system of claim 2, wherein the operations further include making the determination that the initial population reach estimate of the given one of the multiple distinct unions is inconsistent by:
    determining an upper bound based on a sum of the initial population reach estimates of the children of the given one; and
    evaluating that the initial population reach estimate of the given one is above the lower bound.

5. The audience measurement computing system of claim 1, wherein the operations further include making a subsequent determination that the updated population reach estimate for the given one of the multiple distinct unions is not inconsistent with the updated population reach estimates of the one or more others of the multiple distinct unions that are related to the given one.

6. The audience measurement computing system of claim 5, wherein the operations further include outputting the updated population reach estimates for the multiple distinct unions based on making the subsequent determination.

7. The audience measurement computing system of claim 1, wherein the operations further include iteratively adjusting the population reach estimates of the multiple distinct unions based on successively determined errors of the iteratively adjusted population reach estimates until the population reach estimates converge to values for which the successively determined errors satisfy error thresholds.

8. A method implemented by a computing system having at least one processor, the method comprising:
    accessing media exposure data for each of multiple distinct unions of marginal ratings data, wherein accessing the media exposure data comprises receiving meter data from a group of meter devices via a network, wherein meter devices of the group of meter devices meter exposure to media at respective media presentation locations;
    determining, for each of the multiple distinct unions, a pseudo universe estimate of a recorded audience corresponding to the union based on the media exposure data for the union;
    determining, for each of the multiple distinct unions, an initial pseudo universe estimate of a population audience based on the pseudo universe estimate of the recorded audience;
    determining, for each of the multiple distinct unions, an initial population reach estimate based on the initial pseudo universe estimate of the population audience corresponding to the union;
    making a determination that the initial population reach estimate for a given one of the multiple distinct unions is inconsistent with the initial population reach estimates of one or more others of the multiple distinct unions that are related to the given one; and
    in response to making the determination that the initial population reach estimate for the given one of the multiple distinct unions is inconsistent, determining, for each of the multiple distinct unions, an updated pseudo universe estimate of the population audience based on the initial population reach estimate and the media exposure data for the union; and
    determining, for each of the multiple distinct unions, an updated population reach estimate based on the updated pseudo universe estimate of the population audience corresponding to the union.

9. The method of claim 8, wherein the one or more others of the multiple distinct unions that are related to the given one as children of the given one.

10. The method of claim 9, wherein making the determination that the initial population reach estimate of the given one of the multiple distinct unions is inconsistent includes:
determining a lower bound based on a maximum value of the initial population reach estimates of the children of the given one; and
evaluating that the initial population reach estimate of the given one is below the lower bound.

11. The method of claim 9, wherein making the determination that the initial population reach estimate of the given one of the multiple distinct unions is inconsistent includes:
determining an upper bound based on a sum of the initial population reach estimates of the children of the given one; and
evaluating that the initial population reach estimate of the given one is above the lower bound.

12. The method of claim 8, further including making a subsequent determination that the updated population reach estimate for the given one of the multiple distinct unions is not inconsistent with the updated population reach estimates of the one or more others of the multiple distinct unions that are related to the given one.

13. The method of claim 12, further including outputting the updated population reach estimates for the multiple distinct unions based on making the subsequent determination.

14. A non-transitory computer readable medium having stored therein instructions that, when executed by at least one processor of a computing system, cause performance of:
accessing media exposure data for each of multiple distinct unions of marginal ratings data, wherein accessing the media exposure data comprises receiving meter data from a group of meter devices via a network, wherein meter devices of the group of meter devices meter exposure to media at respective media presentation locations;
determining, for each of the multiple distinct unions, a pseudo universe estimate of a recorded audience corresponding to the union based on the media exposure data for the union;
determining, for each of the multiple distinct unions, an initial pseudo universe estimate of a population audience based on the pseudo universe estimate of the recorded audience;
determining, for each of the multiple distinct unions, an initial population reach estimate based on the initial pseudo universe estimate of the population audience corresponding to the union;
making a determination that the initial population reach estimate for a given one of the multiple distinct unions is inconsistent with the initial population reach estimates of one or more others of the multiple distinct unions that are related to the given one; and
in response to making the determination that the initial population reach estimate for the given one of the multiple distinct unions is inconsistent, determining, for each of the multiple distinct unions, an updated pseudo universe estimate of the population audience based on the initial population reach estimate and the media exposure data for the union; and
determining, for each of the multiple distinct unions, an updated population reach estimate based on the updated pseudo universe estimate of the population audience corresponding to the union.

15. The non-transitory computer readable medium of claim 14, wherein the one or more others of the multiple distinct unions that are related to the given one as children of the given one.

16. The non-transitory computer readable medium of claim 15, wherein making the determination that the initial population reach estimate of the given one of the multiple distinct unions is inconsistent includes:
determining a lower bound based on a maximum value of the initial population reach estimates of the children of the given one; and
evaluating that the initial population reach estimate of the given one is below the lower bound.

17. The non-transitory computer readable medium of claim 15, wherein making the determination that the initial population reach estimate of the given one of the multiple distinct unions is inconsistent includes:
determining an upper bound based on a sum of the initial population reach estimates of the children of the given one; and
evaluating that the initial population reach estimate of the given one is above the lower bound.

18. The non-transitory computer readable medium of claim 14, wherein the instructions further cause, when executed by the at least one processor, performance of making a subsequent determination that the updated population reach estimate for the given one of the multiple distinct unions is not inconsistent with the updated population reach estimates of the one or more others of the multiple distinct unions that are related to the given one.

19. The non-transitory computer readable medium of claim 18, further including outputting the updated population reach estimates for the multiple distinct unions based on making the subsequent determination.

20. The non-transitory computer readable medium of claim 14, wherein the instructions further cause, when executed by the at least one processor, performance of iteratively adjusting the population reach estimates of the multiple distinct unions based on successively determined errors of the iteratively adjusted population reach estimates until the population reach estimates converge to values for which the successively determined errors satisfy error thresholds.

* * * * *